Jan. 13, 1970 G. L. SMITH 3,489,371

TAKE-UP REEL

Filed April 26, 1968

GERALD L. SMITH
INVENTOR.

BY Lindenberg & Freilich

ATTORNEYS

United States Patent Office 3,489,371
Patented Jan. 13, 1970

3,489,371

TAKE-UP REEL

Gerald L. Smith, Garden Grove, Calif., assignor to Tally Corporation, Seattle, Wash., a corporation of Washington Filed Apr. 26, 1968, Ser. No. 724,394
Int. Cl. B65h 75/28
U.S. Cl. 242—210 3 Claims

ABSTRACT OF THE DISCLOSURE

A take-up reel for magnetic tape transports comprising a hub with a covering of material which adheres to magnetic tape when the tape is pressed thereagainst. The hub is devoid of an upper flange to enable the operator to press his finger against the tape end when it is on the hub, and thereby cause adhesion.

BACKGROUND OF THE INVENTION

Field of the invention

This invention relates to tape transports, and more particularly to tape reels therefor.

Description of the prior art

The threading of magnetic tape in a tape transport, and particularly the starting of the tape on the take-up reel, is often one of the most annoying tasks in the operation of a tape system. The most common types of reels employ a hub with a pair of flanges, the hub having a slot for holding the end of the tape. It is difficult to quickly insert the end of the tape into the slot, and the delay and requirements for manipulation often make the task disagreeable. In addition, the area near the tape end where it is bent to enter the slot, generally forms a small hump. Succeeding layers of tape are subjected to appreciable stress at the portions which lie over the hump.

One type of reel for facilitating the starting of tape utilizes encapsulated charges to draw the tape to the hub and make it cling. While this facilitates starting and substantially eliminates humps, the tape must still be dropped between the flanges. Also, the electrostatic attraction is generally weak and care must be taken to limit the tape tension at first to prevent pulling the tape off the hub. Furthermore, the electrostatic forces often result in lint accumulating on the hub or tape end. Apparatus which facilitated the starting of magnetic tape on the take-up reel of a tape transport and limited stress concentrations in the tape would contribute to the ease of use of such transports and prolong the life of the tape.

OBJECTS AND SUMMARY OF THE INVENTION

One object of the present invention is to provide an improved take-up reel for a tape transport.

Another object is to provide a take-up reel which facilitates the starting of tape thereon.

Still another object is to provide a take-up reel which substantially obviates stress concentrations in tape wound thereabout.

In accordance with the present invention, a take-up reel is provided which is devoid of an upped flange to facilitate access to the hub. The hub is covered with a material which adheres to magnetic tape material pressed thereagainst with moderate finger pressure. For example, a vinyl material of almost tacky consistency may be used which adheres to iron oxide, a coating material commonly applied to magnetic tape bases. Such a vinyl material also adheres to Mylar, which is a common magnetic tape base. The operator starts the tape on the take-up reel merely by pressing the end thereof against the hub with moderate finger pressure. The pressure causes a strong enough adherence of the tape end to the hub to permit application of moderately high tape tension during the initial turning of the reel.

DESCRIPTION OF THE PREFERRED EMBODIMENTS

Figure 1:
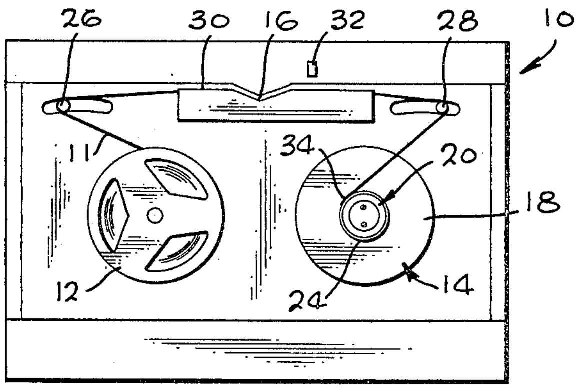
FIGURE 1 is a plan view of a tape transport utilizing a take-up reel constructed in accordance with the invention.

FIGURE 1 illustrates a high performance tape transport 10 for moving magnetic tape 11 between a supply reel 12 and a take-up reel 14. The tape path extends around a pair of storage arms 26 and 28 and through a slot 30. A set of read and write heads, indicated at 16, is located along the slot. The take-up reel 14 has a hub 20 which can be made to adhere to the tape by pressing it thereagainst. In order to facilitate access to the hub, to enable the pressing of tape against it, the reel is devoid of a top flange.

Figure 2:
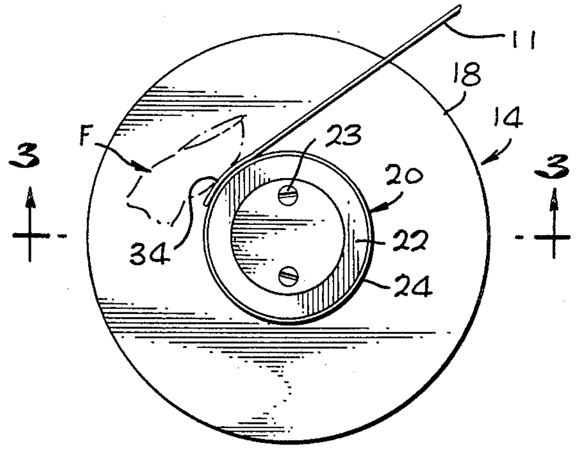
FIGURE 2 is a plan view of the take-up reel of FIGURE 1.
Figure 3:
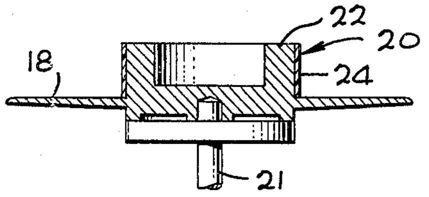
FIGURE 3 is a sectional side view taken on the line 3—3 of FIGURE 2.

The hub 20, which is shown more clearly in FIGURES 2 and 3, comprises an inner ring 22 which is integral with the bottom flange 18. The bottom flange 18 is, of course, a flange disposed adjacent to the deck surface of the transport. The hub is carried on a take-up shaft assembly 21 and is substantially permanently mounted thereon by a pair of screws 23. A covering 24 surrounds the inner ring 22. The covering 24 is of a material which is peelably adhesive to magnetic recording tape, and which is susceptible to adhesion substantially only by pressure from the tape. By the term peelably adhesive, it is meant that the tape can be removed from the hub covering merely by pulling it off with a peeling action. The susceptibility to adhesion by pressure results in the adherence of the covering material to the tape when the tape is pressed (not merely touches) against the covering.

When a new supply reel 12 is placed on the tape transport, the forward end of the tape must be looped about the pair of storage arms 26, 28 and dropped into the slot 30. The capstan and pinch rollers disposed along the slot 30 can be moved apart during threading by a knob 32. Accordingly, threading from the supply reel 12 to the area of the take-up reel 14 can be consistently performed in only a few seconds.

In accordance with the present invention, the starting of the front end of the tape on the take-up reel 14 can also be rapidly performed. This is accomplished by placing about a one-half inch length of the extreme end 34 of the tape, flat against the perimeter of the hub, and pressing it against the hub covering. The placement and pressing against the hub can be performed by an operator pressing his forefinger F against the tape end. Often this is facilitated by squeezing the tape and hub covering together between the forefinger and thumb, with the thumb located behind the rim 22. The take-up reel 14 is then generally rotated a turn or two, and this can be done while the tape is under moderate tension without the likelihood of the tape end 34 being peeled off the hub. The starting of the tape on the take-up reel can be consistently performed in a few seconds by an average operator.

The covering 24 is constructed so that tape adhesion or bonding occurs with moderate pressure, such as a presure of four ounces over a tape area of one-eighth square inch, i.e., a pressure of two pounds per square inch. Thus, a quarter-inch tape is started by pressing a finger against the tape with a force of at least about four ounces. The fore part of a finger can conveniently press down about a half-inch length of the tape in a single press, which is sufficient to prevent accidental bond break and peeling during the initial turning of the take-up reel.

The minimum force for establishing adhesion between the covering and tape is preferably above about one-half ounce and below about five pounds, for a force applied by a finger in a single press, i.e., a pressure above one-quarter and below 40 pounds per square inch. It is often preferable to avoid adhesion below a finger pressure of one-half ounce, because the operator's finger is then likely to cause adhesion before a firm pressure is applied. This may complicate handling because the tape may adhere accidentally while it is "crooked" and have to be pulled off. If a force of over five pounds is required to effect adhesion, a strenuous effort may be required, particularly from female operators, thereby reducing the ease of tape starting.

A type of covering material which has been found suitable for adhesion to common magnetic tape is a low molecular weight polymer, which is, however, of high enough molecular weight to prevent sticking when no appreciable pressure is applied. In particular, type B-44-3 Tygon, a modified polyvinyl chloride material manufactured by the U.S. Stoneware Company, has been found to be suitable. This material can be made to adhere to an iron oxide tape coating with a force of about four ounces over a one-eighth square inch area, for a temperature of 70° F. which is a typical operating temperature for tape transports. This covering material has been found to retain the iron oxide coating when the tape is peeled off, for some grades of audio tape. However, this has not been found to occur in the case of computer grade and better audio grade tapes which utilize better bonding agents. Even if the iron oxide, chromium oxide, or other tape coating is removed from the end of the tape, this does not adversely affect performance since the tape end generally is not used to carry signals. Of course, if many different reels of tape with a poor bonding agent are used, the hub covering may become saturated with oxide, and a new covering would be required. The adhesion to the tape base material, such as Mylar, is also useful for those situations where the base side of the tape is applied to the hub.

What is claimed is:

1. Reel apparatus for a tape transport comprising: tape-receiving means rotatably mounted on said transport, said tape-receiving means having a receiving surface portion constructed of a low molecular weight polymer which is peelably adhesive to an iron oxide tape covering only upon the application of a pressure of at least on the order of two pounds per square inch between it and said iron oxide tape covering, whereby to enable starting of magnetic recording tape only upon the deliberate pressing of said tape against said receiving surface portion.

2. Reel apparatus for a tape transport comprising: hub means for rotation on said transport, having a surface for receiving magnetic recording tape, said surface comprising peelably adhesive material of a low molecular weight polymer which is bondable to a surface of said tape only upon the application of a pressure between them within a range of one-quarter and forty pounds per square inch.

3. Reel apparatus for a tape transport comprising: hub means for rotation on said transport, having a surface for receiving magnetic recording tape, said surface comprising peelably adhesive material of a low molecular weight polymer which is bondable to a surface of sad tape only when the application of pressure between them exceeding on the order of two pounds per square inch.

References Cited

UNITED STATES PATENTS 3,006,650 10/1961 Ellmore.

LEONARD D. CHRISTIAN, Primary Examiner

U.S. Cl. X.R.

242—74